3,489,627
SiO₂, —CaO—BaO COMPOSITION AND METHOD
FOR BONDING THEREWITH
Theodoor Peter Johannes Botden, Johannes Theodorus
Klomp, and Adrianus Johannes Cornelis van de Ven,
Emmasingel, Eindhoven, Netherlands, assignors, by
mesne assignments, to U.S. Philips Corporation, New
York, N.Y., a corporation of Delaware
No Drawing. Continuation of application Ser. No.
269,133, Mar. 29, 1963. This application Feb. 29,
1968, Ser. No. 709,501
Claims priority, application Netherlands, Apr. 3, 1962,
276,753
Int. Cl. B32b 15/04; C04b 35/10; C09j 1/00
U.S. Cl. 156—89                                    5 Claims

ABSTRACT OF THE DISCLOSURE

This application is concerned with a bonding composition consisting essentially of about 25 to 70% by weight of $SiO_2$, the remainder CaO and BaO. The bonding composition is applied to a surface of at least one of two bodies each consisting of a material having a melting point exceeding 1900° C., thereafter heating said composition to a temperature exceeding 1300° C. whereby a melt is formed, and then cooling said composition to solidify the melt to form a bond between said bodies.

---

This application is a continuation of applicant's copending application Ser. No. 269,133 filed Mar. 29, 1963, now abandoned.

Our invention relates to a method of bonding to surfaces of articles of a material which contains aluminium oxide and has a melting point exceeding 1900° C., and to composite articles having a bonded joint made in accordance with the method according to the invention.

The method according to our invention cannot only be used in bonding articles consisting of the said material to one another and/or to articles consisting of refractory metals, for example, molybdenum, tungsten, tantalum, platinum and alloys thereof, but also in bonding surface portions of a single article of a material containing aluminium oxide to one another, for example, in sealing an aperture in said article.

The term "articles of a material which contains aluminium oxide and has a melting point exceeding 1900° C." is used herein to mean sintered aluminium oxide bodies, which may contain a proportion of a few percent of a sintering means, such as the oxides of magnesium, calcium and silicon, the transparent polycrystalline products obtainable according to recent developments, for example, by heating aluminium oxide to a temperature of about 1900° C. in a hydrogen atmosphere, sintered products mainly consisting of aluminium compounds having a high melting point, for example magnesium aluminate, and single crystals of corundum, sapphire, spinel and the like.

As is known, especially the transparent form of aluminium oxide which melts only at a temperature exceeding 2000° C. has interesting optical properties. For example, the absorption of ultraviolet, visible and infrared radiation is very slight.

Furthermore up to a temperature of about 1600° C. the said materials are gas tight and do not soften, while they are capable of withstanding vapours of metals such as sodium and cesium. In addition, at high temperatures the dielectric losses are small even at very high frequencies, for example, at a frequency of 30,000 mc./s. In contradistinction thereto, at about 1200° C. quartz glass becomes permeable to gas and commences to soften, while it is incapable of withstanding the vapour of alkaline metals at temperatures exceeding a few hundreds of degrees C.

In view of said properties aluminium oxide is particularly suitable for envelopes of glow lamps, discharge lamps, discharge tubes and electron tubes and valves or part thereof which in operation are exposed to elevated temperatures. In view of the slight absorption of infrared radiation and of neutrons reference may also be made to the use of said material as a sheath of fuel elements for nuclear reactors, which permits operation at elevated temperature so that the efficiency of said elements can be increased.

The aforementioned favorable properties by which the aluminium oxide materials are distinguished from many other ceramic materials and from quartz and glass, can only be employed to full advantage if gas tight joints having a high softening temperature can be made to surfaces of articles consisting of the aluminium oxide materials.

The known joints between articles of ceramic material, metal or quartz, consisting of glasses having a high content of silica and borosilicate glasses, and the known metallic joints to ceramic articles made by metallizing and soldering, generally do not satisfy the said exacting requirements.

It has been found that the desired result is obtainable with joints in the form of a solidified melt which substantially consists of at least binary systems of $Al_2O_3$ and CaO, BaO and/or $SiO_2$, which may be combined with MgO and/or SrO.

These compositions, especially those containing a comparatively high proportion of aluminium oxide, have coefficients of expansion which are lower by not more than about one half than the coefficient of expansion of the aluminium oxide material of which the articles to be bonded consist. With suitable dimensions a joint may be made which does not crack on variation of the temperature over a wide range. Since the refractory metals possess coefficients of expansion which are lower or not much higher than those of the aluminium oxide materials, the said compositions are also suitable for bonding aluminium oxide materials to the said metals.

According to the invention a joint having a high softening temperature to parts of surfaces of articles consisting of material which contains aluminum oxide and has a melting point exceeding 1900° C. as defined hereinabove and/or to such surfaces and articles of refractory metals such as molybdenum, tungsten, tantalum, platinum and alloys thereof, is made by applying to the joining area or areas a material which is substantially composed of CaO, BaO and/or $SiO_2$, to which MgO, SrO and/or $Al_2O_3$ may be added and in which the proportion of $Al_2O_3$ is at most 75% by weight in compositions containng no $SO_2$ and decreases to at most 60% by weight in compositions containing much $SiO_2$, while the proportion of MgO+SrO as a percentage by weight at most is equal to $(100 - \%Al_2O_3)$ $$\left(1 - \frac{1/3 \times \%SiO_2 + 2/3 \times \%CaO + 1/2 \times \%BaO}{\%SiO_2 + \%CaO + \%BaO}\right)$$

after which the material is heated to a temperature exceeding 1300° C. so as to produce a melt, which then is cooled.

At temperature exceeding 1300° C. and generally below about 1700° C. gas tight joints having a softening temperature exceeding 1250° C. are obtainable by means of the said compositions.

For the purpose of the invention the softening temperature of the bonding is defined by the following measurement. Two plates of the aluminum oxide material of length 10 mms. width 2 mms. and height 1 mm. were butt-joined to one another. The resulting plate was arranged horizontally so as to be supported at the ends, the supports being spaced by a distance of 15 mms. The plate was loaded at the area of the joint by a weight of 0.8 gms. (about 5 times the weight of the plate). The plate was then heated, the temperature being increased at a rate of 5° C. per minute. The softening temperature then was the temperature at which a beginning of sagging is observed at the joined area.

The joint was preferably made with the aid of a material composed of from 70 to 25% by weight of $SiO_2$, from 70 to 20% by weight of CaO and/or BaO and from 0 to 30% by weight of MgO, to which up to 50% by weight of $Al_2O_3$ may be added.

When the bonding material consists of several constituents, these may be present in the form of compounds of the oxides with one another. Such a material is obtainable by previously reacting a mixture of the components while heating. In this event compounds of oxides which on heating are converted into oxides, such as carbonates and hydroxides, for example, $CaCO_3$ and $Al(OH)_3$, may also be used. The use of such substances in mixtures which are not preheated generally is deprecated, since in making the joint a certain amount of gas may be evolved. Minerals, for example, steatite, kaolin and feldspar containing little alkali, may also be used as additional initial materials for the melt.

The above described material may contain up to 15% by weight of other oxides, for example, oxides of alkali metals, zinc and boron, without impairing the properties of the resulting joints. The said admixtures generally improve the spreading of the melt.

For making a joint to aluminum oxide material the fusing material may be applied in the form of powder, grains, chips or the like. Powder may readily be applied as a suspension in a solution of an organic binder, for example, nitrocellulose. The joints are then obtained by heating for a few minutes.

As has been set foth hereinbefore, the joints may be obtained by heating to temperatures of from about 1300° C. to about 1700° C. Generally the materials of the aforementioned compositions melt in this temperature range. This is not the case, however, if CaO and/or BaO which may be combined with MgO and/or SrO, are used as the joining material. These substances have a melting point considerably exceeding 1700° C. Thus, for example, the melting point of CaO is 2572° C. and that of BaO is 1923° C.

Nevertheless in such cases the desired joints can be made by reacting the material in the solid state with the aluminum oxide with the formation of a eutectic having a lower melting point. A eutetcic composition, for example, of CaO and $Al_2O_3$ has a melting point of about 1400° C. By heating to a higher temperature, for example, to 1500° C. for 2 minutes a satisfactorily fusing melt is produced which then absorbs more $Al_2O_3$ and solidifies already without cooling. When BaO is employed, a eutectic composition occurs which has a melting point of 1665° C. In this case a joint is made, with the occurrence of similar phenomena, by heating to about 1700° C. for 2 minutes.

A reaction of the fused material with the aluminum oxide of the articles to be bonded also occurs when $CiO_2$ is used alone which enables a joint having a sufficiently high softening temperature to be obtained with said material by heating to about 1700° C. for about 30 minutes.

Generally the phenomenon of dissolving of $Al_2O_3$ from the articles will occur in the case of fusing materials which contain a small proportion of $Al_2O_3$, which is of advantage with respect to obtaining a joint of satisfactory adherence and also for providing better matching between the coefficients of expansion of the said materials and that of the material which contains aluminum oxide. To prevent excessive attack of the articles to be bonded, the proportion of $Al_2O_3$ must not be too small and/or heating must not be performed for too long a time or at too high a temperature. To avoid the difficulty that the material will only be molten at very high temperatures, and at the same time to prevent excessive attack of the surfaces to be bonded, a large part of the required $Al_2O_3$ is preferably contained in the fusing material in the free state.

The following tables show a plurality of examples of suitable compositions of fusing materials which consist of several oxides, expressed in percentages by weight, and the temperature T expressed in ° C. to which the relevant material was heated to make the joint. They further show the softening temperature D expressed in ° C. at which deformation of the joint sets in according to the above described measurement.

In all these cases the joint was made by heating at a rate of about 150° C. per minute to the temperature of T° C. After the material had been maintained at this temperature for 2 minutes, the assembly was cooled at the same rate of about 150° C. per minute.

TABLE 1.—BINARY COMPOSITIONS

| | CaO | MgO | SrO | $SiO_2$ | $Al_2O_3$ | T° | D° |
|---|---|---|---|---|---|---|---|
| 1 | 48.2 | | | 51.8 | | 1,550 | [1]1,453 |
| 2 | 47.8 | | | | 52.2 | 1,455 | [1]>1,600 |
| 3 | | | 40 | 60 | | 1,600 | [1]>1,600 |
| 4 | 67 | | | 33 | | 1,450 | [2] |
| 5 | 67 | | 33 | | | 1,450 | [2] |

[1] Pre-reacted.
[2] Not pre-reacted.
> means "exceeding."

TABLE 2.—TERNARY COMPOSITIONS

| | CaO | MgO | SrO | $SiO_2$ | $Al_2O_3$ | T° | D° | |
|---|---|---|---|---|---|---|---|---|
| 6 | 19.6 | 28.6 | | 51.8 | | 1,500 | | Cracking. |
| | 19.6 | 28.6 | | 51.8 | | 1,600 | 1,565 | |
| 7 | 33.5 | 22.8 | | 43.7 | | 1,460 | | Cracking. |
| | 33.5 | 22.8 | | 43.7 | | 1,600 | 1,430 | |
| 8 | 37.5 | 6.2 | | 56.3 | | 1,400 | 1,420 | |
| 9 | 54.0 | 4.9 | | | 41.1 | 1,500 | >1,600 | |
| 10 | 39.7 | 6.5 | | | 53.8 | 1,450 | >1,600 | |
| 11 | 46.1 | 5.8 | | | 48.1 | 1,350 | | No melt. |
| | 46.1 | 5.8 | | | 48.1 | 1,450 | >1,600 | |
| 12 | 11.5 | | | 52.5 | 36.0 | 1,600 | | Cracking. |
| | 11.5 | | | 52.5 | 36.0 | 1,700 | 1,540 | |
| 13 | 32.0 | | | 31.5 | 36.5 | 1,400 | 1,550 | |
| 14 | 41.5 | | | 40.5 | 18.0 | 1,300 | 1,435 | |
| 15 | 26.6 | | | 36.8 | 36.6 | 1,500 | | Cracking. |
| | 26.6 | | | 36.8 | 36.6 | 1,600 | 1,550 | |
| 16 | | 30.9 | | 48.5 | 20.6 | 1,500 | 1,495 | |
| 17 | | 30.5 | | 62.9 | 6.6 | 1,500 | 1,540 | |
| 18 | | | 27.1 | 47.2 | 25.7 | 1,500 | | Cracking. |
| | | | 27.1 | 47.2 | 25.7 | 1,600 | >1,600 | |
| 19 | | | 34.4 | 47.8 | 17.8 | 1,550 | | Cracking. |
| | | | 34.4 | 47.8 | 17.8 | 1,600 | 1,400 | |
| 20 | 15 | | 49 | 36 | | 1,400 | | |

Note.—Except for composition No. 20 all these compositions have been pre-reacted.

TABLE 3.—TERNARY COMPOSITIONS WITH AN ADDITION

| | CaO | MgO | $SiO_2$ | $Al_2O_3$ | Addition | T° | D° |
|---|---|---|---|---|---|---|---|
| 21 | 55.0 | | 27.3 | 17.7 | 10% $Na_2O$ | 1,300 | >1,600 |
| 22 | 29.8 | | 33.6 | 36.6 | 5% $B_2O_3$ | 1,400 | 1,430 |
| 23 | 45.1 | 7.7 | | 47.2 | 5% $Na_2O$ | 1,400 | 1,540 |
| 24 | 49.4 | 6.0 | | 44.6 | 10% $B_2O_3$ | 1,350 | 1,550 |
| 25 | | 24.5 | 59.5 | 16.0 | 10% ZnO | 1,480 | 1,565 |
| 26 | | 20.0 | 57.4 | 22.6 | 5% ZnO | 1,400 | 1,510 |
| 27 | 22.7 | 23.9 | 53.4 | | 5% ZnO | 1,400 | 1,565 |
| 28 | 37.5 | 6.2 | 56.3 | | 10% ZnO | 1,400 | 1,460 |

All the ternary mixtures had been pre-reacted. The $Na_2O$ was added in the form of the carbonate and the $B_2O_3$ in the form of boric acid. After mixing the compositions had been pre-reacted another time.

TABLE 4.—QUATERNARY COMPOSITIONS

| | CaO | BaO | MgO | SrO | $SiO_2$ | $Al_2O_3$ | T° | D° |
|---|---|---|---|---|---|---|---|---|
| 29 | 39.5 | 4.8 | | | 38.6 | 17.1 | 1,300 | 1,420 |
| 30 | 37.7 | 9.1 | | | 36.8 | 16.4 | 1,300 | 1,420 |
| 31 | 37.8 | 4.8 | 6.2 | | 51.2 | | 1,450 | 1,550 |
| 32 | 36.1 | 9.1 | | 5.9 | 48.9 | | 1,450 | >1,600 |
| 33 | | 33.4 | 20.6 | | 32.4 | 13.6 | 1,500 | |
| 34 | 33.2 | | | 20.0 | 32.4 | 14.4 | 1,400 | |
| 35 | | | 14.7 | 28.6 | 34.6 | 22.1 | 1,400 | |

The compositions 29 to 32 had been pre-reacted. The compositions 33 to 35 had been partially pre-reacted and the BaO and SrO were present in the free state.

Finally the influence of the presence of free $Al_2O_3$ is demonstrated with reference to the compositions shown in the following table.

TABLE 5

| | CaO | $Al_2O_3$ | $SiO_2$ | Addition | T° | D° | |
|---|---|---|---|---|---|---|---|
| 36 | 41.5 | 18.0 | 40.5 | — | 1,300 | 1,435 | |
| 37 | 41.5 | 18.0 | 40.5 | 60% of $Al_2O_3$ | 1,400 | — | $Al_2O_3$ partially dissolved. |
|    | 41.5 | 18.0 | 40.5 | 60% of $Al_2O_3$ | 1,500 | 1,550 | $Al_2O_3$ completely dissolved. |
| 38 | 36.2 | 36.5 | 27.3 | — | 1,500 | >1,600 | |
| 39 | 36.2 | 36.5 | 27.3 | 30% of $Al_2O_3$ | 1,500 | >1,600 | $Al_2O_3$ completely dissolved. |

What is claimed is:

1. A method of bonding together performed bodies, a surface of at least one of the bodies consisting of a material having a melting point exceeding 1900° C. which comprises the steps of applying to a surface of at least one of said bodies a bonding-composition consisting essentially of about 25 to 70% by weight of $SiO_2$ and the remainder CaO and BaO, thereafter heating said bonding composition to a temperature exceeding 1300° C. whereby a melt is formed, and then cooling said composition to solidify the melt to form a bond between said bodies.

2. A method as claimed in claim 1, in which the bonding composition contains up to 30% by weight of MgO.

3. A method as claimed in claim 1, in which the surface of at least one of the bodies consists of aluminum oxide.

4. A method as claimed in claim 1, in which the surface of at least one of the bodies consists of a refractory metal selected from the group consisting of molybdenum, tungsten, tantalum, platinum, and alloys thereof.

5. A bonding composition for bonding together preformed bodies, a surface of at least one of the bodies consisting of a material having a melting point exceeding 1900° C., said composition consisting essentially of about 25 to 70% by weight of $SiO_2$, the remainder CaO and BaO.

References Cited

UNITED STATES PATENTS

| | | | |
|---|---|---|---|
| 2,843,507 | 7/1959 | Long | 117—129 |
| 3,026,210 | 3/1962 | Coble | 106—42 |
| 3,060,040 | 10/1962 | Bristow | 106—46 |
| 3,167,438 | 1/1965 | Bristow | 106—46 |
| 3,281,309 | 10/1966 | Ross | 161—196 |

OTHER REFERENCES

Levin et al., "Phase Diagrams For Ceramics", Pub. by The Amer. Ceramic Soc. (1956) Columbus, Ohio pgs. 41, 46–48, 54–56, 60, 63, 64, 114, 119, 124–127, 142–144.

ROBERT F. BURNETT, Primary Examiner

WILLIAM J. VAN BALEN, Assistant Examiner

U.S. Cl. X.R.

161—192, 196; 106—42, 52, 62